United States Patent [19]

Hansen

[11] 4,200,166
[45] Apr. 29, 1980

[54] ARM REST FOR THE OPERATOR'S SEAT ON A MOVING MACHINE

[75] Inventor: Rudolf Hansen, Freising, Fed. Rep. of Germany

[73] Assignee: Steinbock GmbH, Moosburg, Fed. Rep. of Germany

[21] Appl. No.: 897,561

[22] Filed: Apr. 18, 1978

[30] Foreign Application Priority Data

Apr. 26, 1977 [DE] Fed. Rep. of Germany ....... 2718579

[51] Int. Cl.² ............................................. B60K 23/00
[52] U.S. Cl. .................................. 180/77 R; 74/523; 297/411
[58] Field of Search ................. 180/77 R, 77 S, 77 H, 180/DIG. 3, 90; 244/83 F; 297/411; D12/174, 179; 74/523, 543; 16/121; D8/300, 313, DIG. 2, 10, 307, 308, 310, 312

[56] References Cited

U.S. PATENT DOCUMENTS

| | | | |
|---|---|---|---|
| D. 190,597 | 6/1961 | Nelson | D8/307 |
| 3,167,336 | 1/1965 | Lewis | 74/543 |
| 3,191,994 | 6/1965 | Boyce | 297/411 |
| 4,055,230 | 10/1977 | Kestian | 180/77 R |

*Primary Examiner*—Richard A. Bertsch
*Assistant Examiner*—Donn McGiehan
*Attorney, Agent, or Firm*—Toren, McGeady and Stanger

[57] ABSTRACT

An armrest adjacent the seating surface for the operator of a fork lift truck or like moving machine has a top face elongated in a predominantly horizontal direction. A low and narrow, elongated side wall projects from the top face adjacent the operator so as to be normally received between the operator's body and lower arm and elbow and to secure the operator. Control elements for the machine are mounted on the front portion of the top face for operation by the fingers of an arm resting on the top face.

8 Claims, 7 Drawing Figures

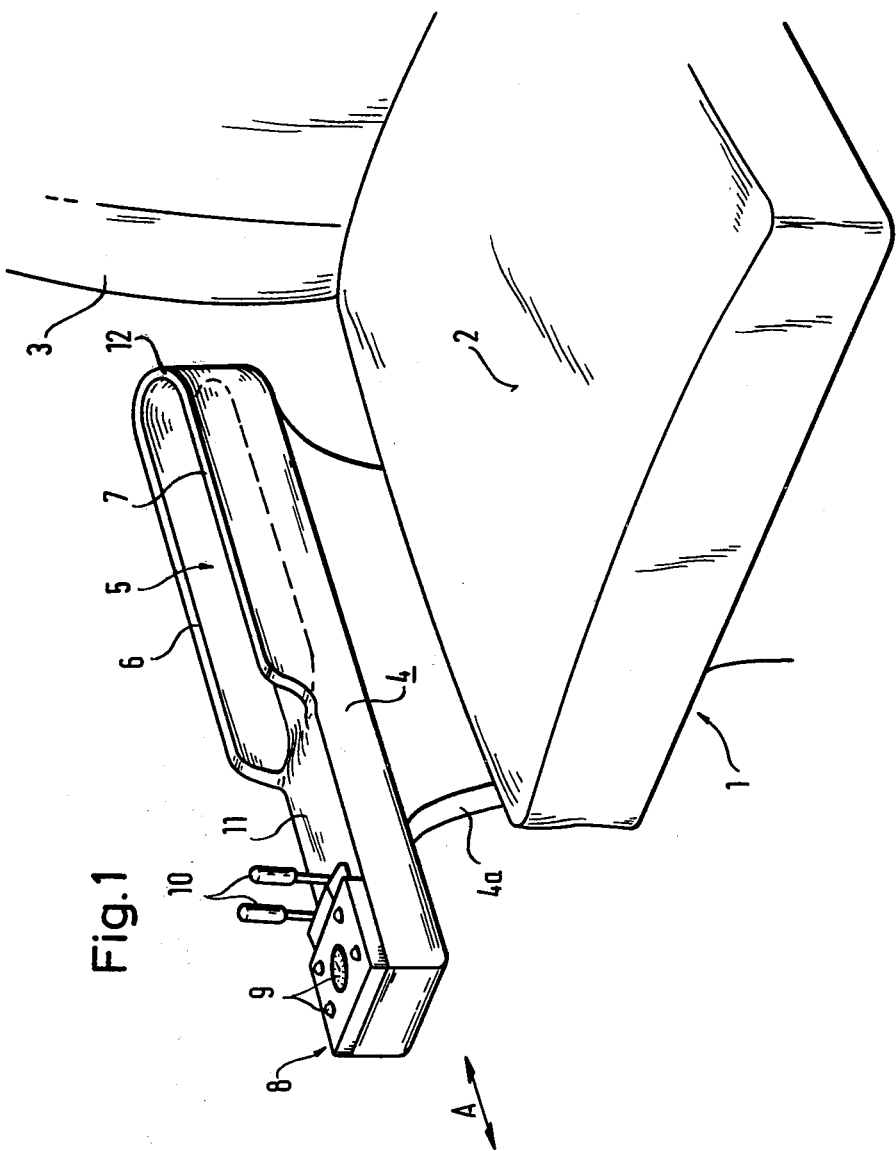

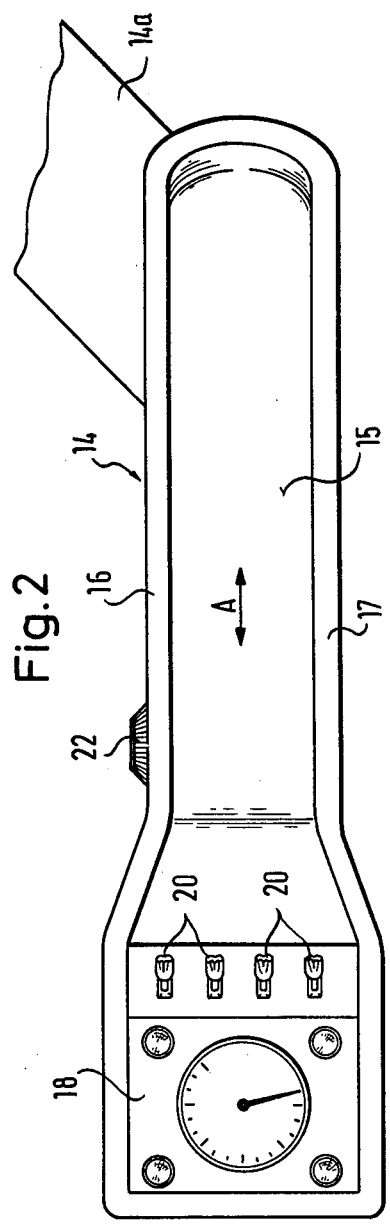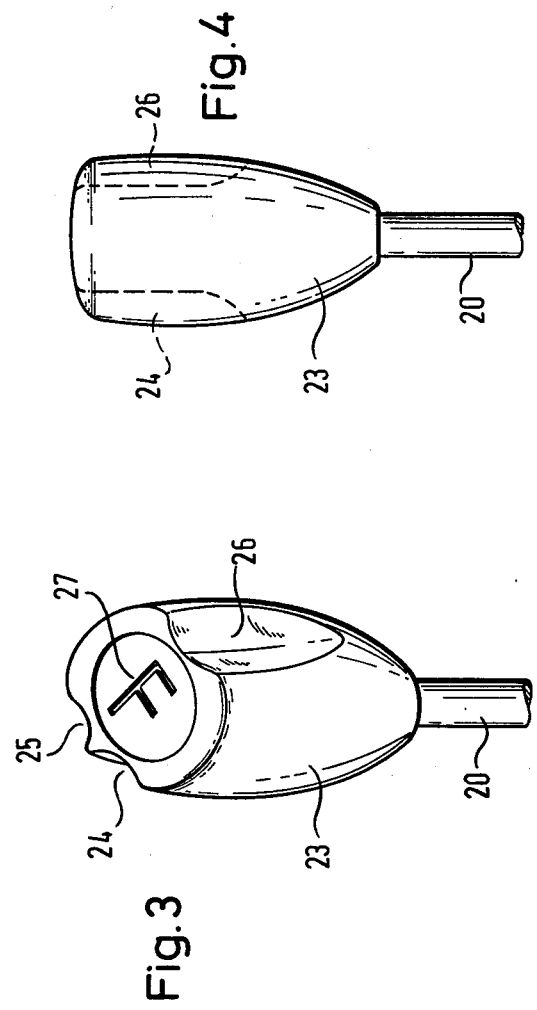

ARM REST FOR THE OPERATOR'S SEAT ON A MOVING MACHINE

The invention relates to an operator's support for a movable machine, and more particularly to an armrest next to the seating surface for the operator.

The invention will be described with reference to a fork lift truck, but is equally applicable to other machines whose movements are sudden enough to throw a careless operator from his seat while it is impractical to secure the operator by means of a seat belt or the like which would interfere with his normal activities.

It has now been found that the risk of the operator being thrown from his seat by an abrupt movement of the machine can be reduced substantially without impeding intentional movement of the operator into and out of his seat by an armrest of specific configuration. The armrest of this invention has a top face which extends horizontally and is elongated in a forward and rearward direction relative to the normal machine movement. The top face has two longitudinal edge portions respectively remote from and adjacent the seating surface for the operator. A side wall projects upward at least from the adjacent edge portion. Its height is smaller than its forward-and-backward length and at least equal to the horizontal thickness of the side wall which in turn is smaller than the width of the top face, thereby permitting the side wall to be clamped without conscientious effort between the lower arm and elbow of the operator supported on the top face of the armrest and the body of the operator. The clamping pressure is increased as a reflex of the operator to an abrupt movement of the machine, and he is much less likely to be thrown from his seat than in the absence of the armrest of the invention.

Other features and many of the attendant advantages of this invention will readily be appreciated as the same becomes better understood from the following detailed description of preferred embodiments when considered in connection with the appended drawing in which:

FIG. 1 is a fragmentary, perspective view of an operator's support including an armrest of the invention;

FIG. 2 is a top plan view of a modified armrest and of associated elements;

FIG. 3 is a perspective view on a larger scale of a control element on the armrest of FIG. 2;

FIG. 4 shows the control element of FIG. 3 in side elevation;

Figure 5:
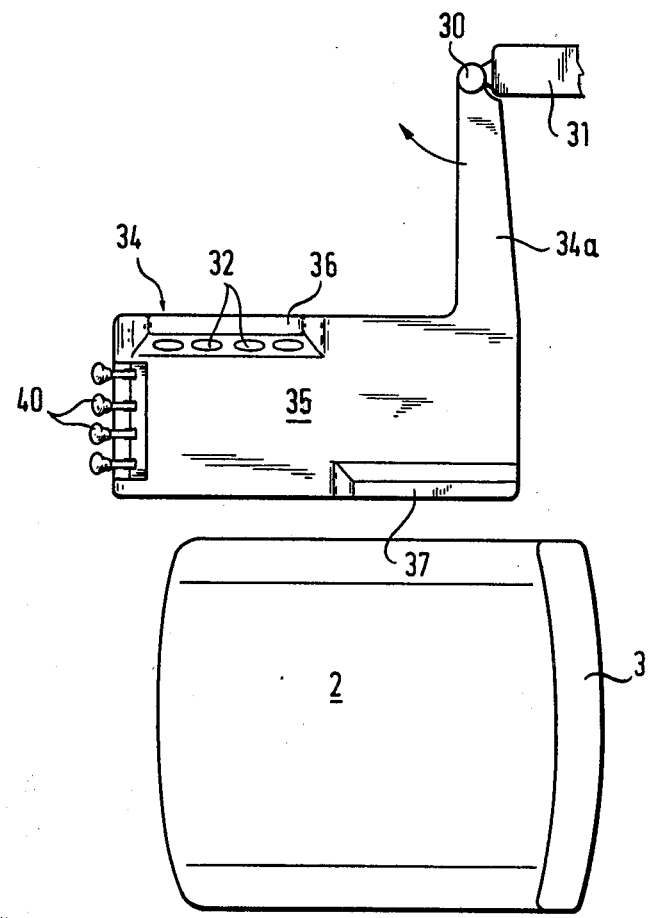
FIG. 5 illustrates another operator's support of the invention in fragmentary top plan view.

Referring now to the drawing in detail, and initially to FIG. 1, there is shown only as much of the operator's seat 1 in a fork lift turck as is necessary for an understanding of the invention. Backward movement of the operator on the seating surface 2 of his seat is limited by a vertically, extending backrest 3. Movement of the seated operator toward his right is limited by an armrest 4 which may be adjusted in the forward and rearward direction on a mounting element 4a as is indicated by a double arrow A. As is conventional in automotive seats and not explicitly shown, a rack on the mounting element 4a is dovetailed in a mating longitudinal groove in the bottom surface of the armrest 4, and the armrest is held in the selected longitudinal position by a spring-loaded, manually releasable detent. The mounting element 4a is a fixed part of the machine frame, not otherwise shown in FIG. 1, on which the operator's seat is also fastened.

The top face 11 of the armrest 4 is elongated in a direction which has a predominant horizontal component in all operative conditions of the illustrated operator's support. A shallow groove 5 extending forward from the rear end of the arm rest over less than two thirds of the length of the top face 11 is extended upward by two parallel side walls 6, 7 respectively projecting upward from the longitudinal edges of the top face 11 and bounded rearwardly by an arcuate end wall 12 which transversely connects the side walls 6, 7.

The walls 6, 7, 12 are of approximately equal and uniform height, much smaller than the length of the side walls 6, 7, and their even smaller thickness leaves space in the groove 5 for the right elbow of an operator supported on the seating surface 2 and a portion of its lower, right arm. The operator's fingers project freely forward and outward from the groove 5. A console 8 on the front end of the top face 11 carries pilot lights 9 which indicate the operating condition of the machine in a conventional manner, and two small control levers 10 are pivoted to the console for movement about a horizontal axis perpendicular to the direction of armrest elongation. They are within easy reach of the operator's fingers whose arm need not be lifted from the top face 11 during adjustment of the levers 10 which may control vertical movement of the fork lift or acceleration of the vehicular base.

The side wall 7 is normally located between the operator's right elbow and body and thus prevents the operator from sliding to the right or left on the seating surface 2. The end wall 12 prevents rearward movement of the elbow, and this restraint may be transmitted to the body by tensioning of the arm muscles which may also clamp the side wall 7 to the body with sufficient force to prevent the operator from sliding forward. Yet, the operator is free to leave the seat 1 after only slightly raising his right arm out of the groove 5. The width of the groove is not overly critical, but it must be greater than three inches to accommodate a normal, clothed, adult elbow, and need not be wider than six inches.

The freedom of finger movement which is achieved on the arm rest 4 of FIG. 1 by making the side walls 6, 7 more than one third shorter than the top face 11 of the armrest 4 is provided in the armrest 14 illustrated in FIG. 2 by side walls 16, 17 whose transversely connected, parallel rear portions bound a groove 15 for the elbow and a portion of the lower arm of the operator while the front portions of the walls diverge and are connected at their front ends to envelope a console 18 carrying indicating lights and/or instruments and four control levers 20 pivotable abut a common horizontal axis. The diverging portions of the walls 16, 17 do not interfere with access of the operator's fingers to the levers 20 without requiring him to raise his elbow and arm from the groove 15.

The armrest 14 may be moved forward and backward on an associated fixed base 14a as described above and indicated in FIG. 2 by a double arrow A when a button 22 on the outer surface of the wall 16 is pressed.

Operation of the levers 20 by three fingers is facilitated by the configuration of knobs 23 at the free ends of the levers 20 as shown in FIGS. 3 and 4. The forward facing side of each knob in formed with two grooves 24, 25 dimensioned to receive the tips of the second and third fingers. A slightly larger groove 26 in the rear face of the knob 23 may receive the thumb of the same hand. The grooves 24, 25, 26 are elongated radially relative to the pivot axis of the levers 20 and open in a radially outward direction so as to form notches in the flat and otherwise circular end face 27 of the knob which may carry indicia indicative of the function of the lever. The levers may also move axially on their pivots so as to permit a multiple speed transmission to be shifted by a combination of axial and angular movements in a pattern engraved in the illustrated end face 27.

Figure 6:
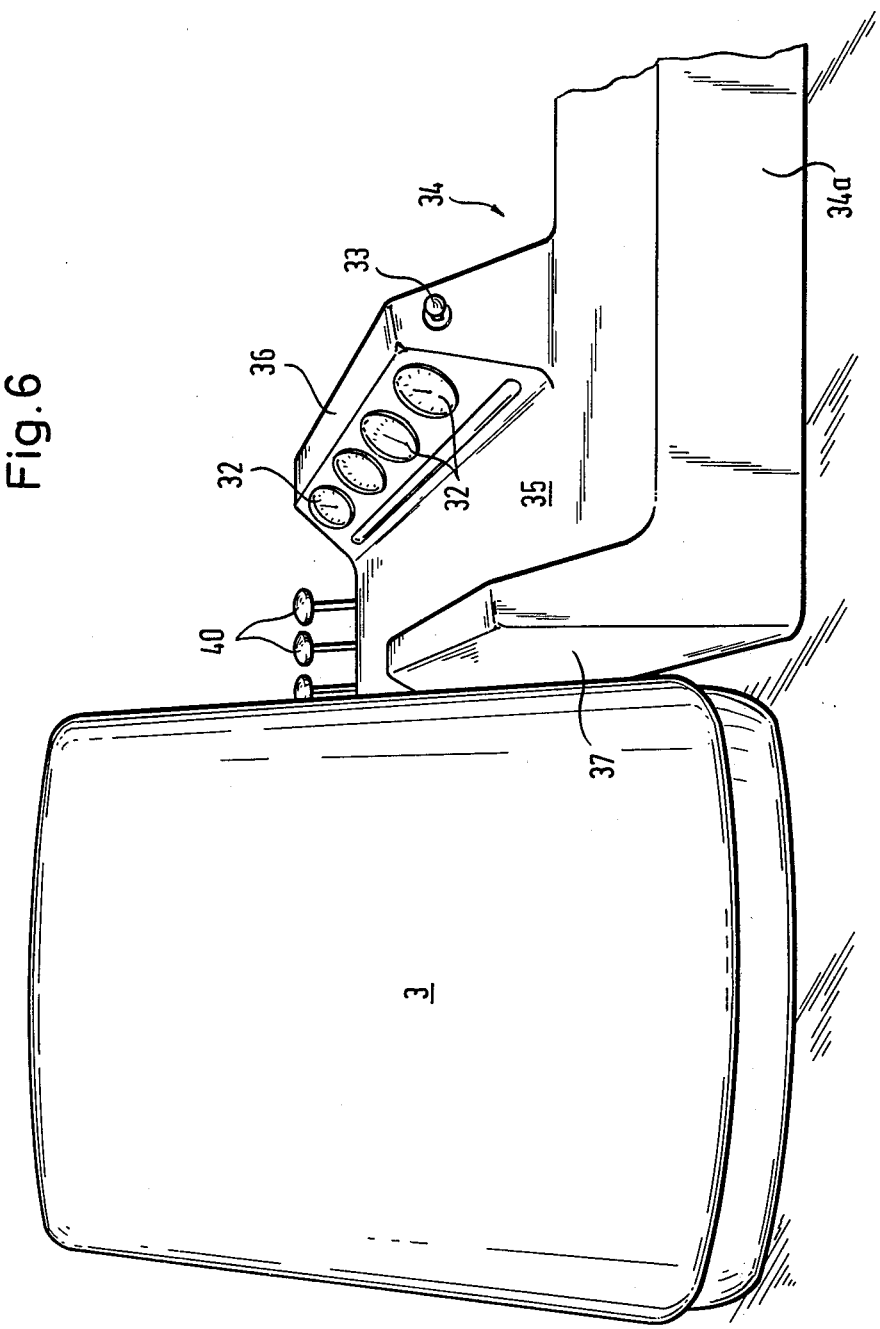
FIG. 6 illustrates portions of the apparatus of FIG. 5 in a perspective rear view.
Figure 7:
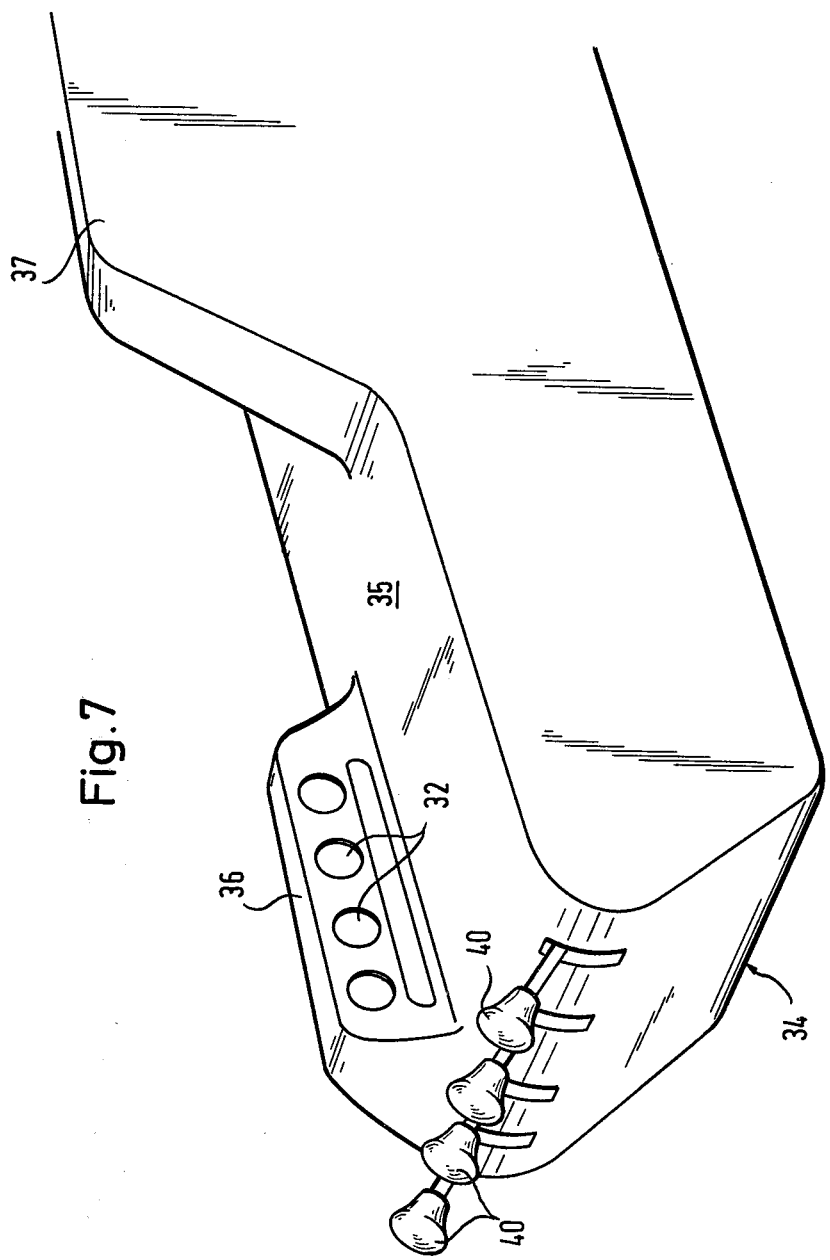
FIG. 7 is a perspective, fragmentary front view of the arm rest also shown in FIGS. 5 and 6.

The arm rest 34 shown in FIGS. 5 to 7 is mounted on a fixed portion 31 of the vehicle body by a hinge 30 and a bracket 34a, as is shown in FIG. 5 only. The top face 35 of the arm rest 34 is approximately flat. A side wall 37 rises from the edge of the top face near the seating surface 2, and its rear end is closely adjacent the back rest 3 so that the wall 37 is normally located between the elbow and the body of the operator. The wall 37 extends only over approximately one half the length of the top face 35. Another side wall 36 projects upward from the front half of the top face 35 along the edge remote from the seat surface 2. While the side wall 36 may assist the operator in securing himself on the seating surface 2, its face directed toward the operator displays four instruments 32 which may indicate the engine speed, fuel supply, electric current flow, and engine temperature in a conventional manner. A button 33 on the narrow rear face of the wall 36 actuates an electric starter for the non-illustrated internal-combustion engine. Vertical displacement of the fork lift and other operations are controlled by levers 40 which project upward beyond the top face 35 at least in their idle illustrated positions, and are within range of the operator's fingers which may overhang the top face 35 and press the levers 40 down against non-illustrated return springs.

The arm rests 4, 14, 34 and the respective associated side walls 6, 7, 16, 17, 36, 37 may be molded integrally from synthetic resin compositions. Relatively rigid polyurethane foam is the presently preferred material of construction at least for the exposed surface portion. The foam can be chosen to have adequate mechanical strength for the intended purpose even though those surfaces engaged by the operator such as the face of the side walls 7, 17, 37 may be resilient enough to avoid injury to the operator during abrupt changes in the speed or direction of movement of the fork lift truck. The use of other cushioning material covered by polyvinyl chloride or the like, as is conventional in the interior of automotive vehicles, is specifically contemplated.

While the invention has been described with specific reference to a fork lift truck, it may find use in other movable machines including, but not limited to road building machines and, rotary cranes. It should be understood, therefore, that the foregoing disclosure relates only to preferred embodiments, and that it is intended to cover all changes and modifications of the examples of the invention herein chosen for the purpose of the disclosure which do not constitute departures from the spirit and scope of the invention set forth in the appended claims.

What is claimed is:

1. In an operator's support for a movable machine including a horizontally extending seating surface, back rest means for limiting rearward movement of an operator seated on said surface, and an armrest laterally offset from said surface and upwardly projecting beyond the same, the improvement in the armrest which comprises:

the armrest having a horizontally extending top face elongated in a forward and rearward direction, said top face having two longitudinal edge portions one remote from and one adjacent said surface respectively;

a side wall projecting upwardly from said adjacent edge portion, the height of said side wall being smaller than the length thereof in said direction and at least equal to the horizontal thickness thereof transverse to said direction, said thickness being smaller than the width of said top face, said side wall having a rear terminal portion closely adjacent said back rest means, said side wall extending forwardly from said rear terminal portion;

said top face having a longitudinally terminal front portion remote from said back rest means, a plurality of control elements for controlling operation of said machine being movably mounted on said armrest and projecting upwardly from said front portion; and another side wall projecting upward from said remote edge portion, said other side wall being elongated in said direction, said side walls being transversely spaced from each other and having respective terminal front portions longitudinally coextensive with said longitudinally terminal front portion of said top face, the terminal front portions of said side walls flaring in a forward direction.

2. In an operator's support for a movable machine including a horizontally extending seating surface, back rest means for limiting rearward movement of an operator seated on said surface, and an armrest laterally offset from said surface and upwardly projecting beyond the same, the improvement in the armrest which comprises:

the armrest having a horizontally extending top face elongated in a forward and rearward direction, said top face having two longitudinal edge portions one remote from and one adjacent said surface respectively;

a side wall projecting upwardly from said adjacent edge portion, the height of said side wall being smaller than the length thereof in said direction and at least equal to the horizontal thickness thereof transverse to said direction, said thickness being smaller than the width of said top face, said side wall having a rear terminal portion closely adjacent said back rest means, said side wall extending forwardly from said rear terminal portion;

said top face having a longitudinally terminal front porion remote from said back rest means, a plurality of control elements for controlling operation of said machine being movably mounted on said armrest and projecting upward from said front portion; and another side wall projecting upward from said remote edge portion, said other side wall being elongated in said direction, said side walls being transversely spaced from each other and offset longitudinally from each other, said other side wall carrying an indicating instrument.

3. In a support as set forth in claims 1 or 2, said side walls being longitudinally coextensive and bounding therebetween an elongated groove, a rear wall connecting said other side wall to said rear terminal portion and bounding said groove in a rearward direction.

4. In a support as set forth in claim 3, the width of said groove being at least three inches and sufficient to receive the elbow and lower arm of an adult person.

5. In a support as set forth in claim 3, said walls and said armrest being fixedly fastened to each other.

6. In a support as set forth in claims 1 or 2, at least one of said control elements being mounted on said armrest for pivoting movement about a horizontally extending axis transverse to the direction elongation of said top face, said control element being formed with three grooves radial relative to said axis, two of said grooves being directed forward and one backward.

7. In a support as set forth in claims 1 or 2, mounting means mounting said armrest for movement relative to said seating surface.

8. In a support as set forth in claim 7, said mounting means including a pivot having an axis transverse to said seating surface.

* * * * *